United States Patent [19]

Kelly

[11] Patent Number: 5,766,068

[45] Date of Patent: Jun. 16, 1998

[54] HINGELESS VENTILATOR WITH UNITARY BRACKET

[76] Inventor: Timothy A. Kelly, 801 Virginia Ave., Salem, Va. 24153

[21] Appl. No.: 819,822

[22] Filed: Mar. 18, 1997

[51] Int. Cl.⁶ .............................. B60H 1/26; F24F 13/10
[52] U.S. Cl. .............................. 454/145; 454/273
[58] Field of Search .............................. 454/145, 149, 454/158, 273, 333

[56] References Cited

U.S. PATENT DOCUMENTS

| | | | |
|---|---|---|---|
| 1,374,696 | 4/1921 | Wells | 454/149 |
| 3,102,464 | 9/1963 | Kelly et al. | 454/145 |
| 3,358,576 | 12/1967 | Kelly et al. | 454/145 |
| 3,456,571 | 7/1969 | Kelly et al. | 454/145 |
| 3,672,291 | 6/1972 | Kujawa, Jr. | 454/145 |
| 3,760,707 | 9/1973 | Kelly | 454/145 |
| 3,839,950 | 10/1974 | Kelly et al. | 454/145 |
| 4,452,129 | 6/1984 | Kelly et al. | 454/145 |
| 5,020,425 | 6/1991 | Kelly | 454/145 |

FOREIGN PATENT DOCUMENTS

| | | | |
|---|---|---|---|
| 2459899 | 7/1975 | Germany | 454/145 |
| 3992 | 3/1893 | United Kingdom | 454/273 |

*Primary Examiner*—Harold Joyce
*Attorney, Agent, or Firm*—Dority & Manning

[57] ABSTRACT

A hingeless ventilator is provided for ventilating a compartment and includes a frame for attaching about an opening in the wall of the compartment. A closure member is swingable against an outer side of the frame for opening and closing the opening. Guide members extend from the frame into the compartment and arm members extend from the closure member through the opening. A holding mechanism is configured with the arm members and guide members to supply a closing tensile force to the closure member. The closure member and the arm members are formed from a unitary plate with the arm members bent at essentially right angles to a base portion of the plate. The closure member includes a cover member, preferably formed of a plastic material, attached to the outer surface of the base portion.

13 Claims, 3 Drawing Sheets

HINGELESS VENTILATOR WITH UNITARY BRACKET

BACKGROUND OF THE INVENTION

There are a number of Kelly and Kelly et al. patents on hingeless ventilators particularly designed for ventilating a cab or other compartment of a vehicle. Among these patents are U.S. Pat. Nos. 3,102,464; 3,358,576; 3,839,950; 4,452,129; and 5,020,425. All of these patents describe two-way hingeless ventilators having closure members openable in one direction to draw air into the compartment, and openable in the opposite direction to exhaust air from the vehicle compartment. In each of these patents, the ventilator has a frame attachable to a wall of a vehicle compartment about an aperture defined therein. The frame has an opening corresponding to the aperture which is bounded by an outwardly turned flange. The closure member is swingable between open and closed positions against the outside of the frame and has an inwardly turned flanged surrounding and overlapping the frame flange.

Each of the patents mentioned above also describes a holding mechanism for supplying a tensile closing force to the closing member. U.S. Pat. No. 3,839,950 describes the holding mechanism as a spring rod connected to the closure member by way of bilaterally spaced arms which extend through the opening in the frame. The spring rod rides on guide members fixed to the frame for selectively positioning the closure member. U.S. Pat. No. 4,452,129 describes an alternative embodiment of the holding mechanism in which rollers are mounted on projecting stub axles of the arms. The rollers are formed from an elastomeric collar and ride against the guide members in a compressed state. Compression of the collars against the guide surfaces of the guide members provides the tensile force to the closure member.

In all of the prior art hingeless ventilators described in my previous U.S. Patents, the closure member consisted of a metal cover and the arm members were separately welded onto the cover to extend from the inner side thereof. Although my prior systems have proven to be a substantial advancement in the art, I have found that improvements can be made in the manufacturing process of my hingeless ventilators which not only allow for a less expensive manufacturing process, but allow for more flexibility in the use of different and more aesthetically pleasing materials for the closure member.

The present invention relates to improvements in my prior hingeless ventilators.

SUMMARY AND OBJECTS OF THE INVENTION

It is a principle object of the present invention to provide an improved hingeless ventilator wherein the closure or cover member is not limited to a steel member.

An additional object of the present invention is to provide an aesthetically pleasing hingeless ventilator wherein the cover member does not show or otherwise exhibit weld marks.

Yet another object of the present invention is to provide a hingeless ventilator incorporating universal parts for configuration with alternative embodiments of my prior tensile force holding mechanisms.

And still a further object of the present invention is to provide a less costly manufacturing process for hingeless ventilators.

Additional objects and advantages of the invention will be set forth in part in the following description, or may be obvious from the description, or may be learned through practice of the invention.

In accordance with the objects and purposes of the invention, the present inventive hingeless ventilator for ventilating a compartment through an aperture defined in a wall of the compartment includes a frame configured for attachment to the wall about the aperture. The frame has a central opening therethrough passing air through the aperture. In a preferred embodiment, a perforated plate covers the central opening and is formed integral with or connected to the frame. The closure member is swingable against an outer side of the frame for opening and closing the central opening. Guide members are fixed to an inner side of the frame and extend generally normal or perpendicular to the frame. Arm members extend from the closure member at opposite ends thereof through the opening. In the embodiment wherein a perforated plate covers the opening, the arm members extend through slots defined in the perforated plate.

A holding mechanism is configured with the arm members and the guide member to supply a closing tensile force to the closure member through the arm members. The tensile force holds the closure member against the frame in selected variable positions of the closure member relative to the frame. According to a key feature of the invention, the closure member and the arm members are formed from a unitary plate wherein the arm members are bent at essentially right angles to a base portion of the plate. The base portion includes upward turned flanges along the long sides therefor. The closure member thus includes a cover member, preferably formed from an inexpensive plastic or metal material, attached to an outer surface of the base portion.

In one embodiment of the present invention, the cover member is molded from an inexpensive plastic and glued or otherwise adhered to the outer surface of the base portion. The cover member can also be formed from a relatively thin, inexpensive metal. The cover member fits over the upward turned flanges formed on the long sides of the plate base portion and, thus, does not absorb any torquing forces of the closure member. The cover member thus does not need to be a particularly strong member since its function is aesthetic, and not structural.

The holding mechanism can be a prior art mechanism, including the spring rod as described in U.S. Pat. No. 3,839,950, or the compressible rollers as described in U.S. Pat. No. 4,452,129. The unitary plate according to the present invention is mateable with either of the holding mechanisms. In this manner, the manufacturing process is significantly simplified since only a single component need be manufactured for either type of device. Preferably, the unitary plate is stamped or cut from a single piece of sheet metal with the arm members and bracket member then being bent at essentially right angles to the base portion of the plate. It is a relatively simple manufacturing step to then glue, tape, or otherwise adhere the plastic cover member to the base portion.

With my previous hingeless ventilators, the cover member was a steel plate with an inwardly turned flange. The arm members were separate steel members welded to the inner surface of the cover member. Despite the greatest care taken in the manufacturing process, the weld spots were still noticeable on the outer surface of the cover member. The weld spots were particularly noticeable once the vent was installed in a compartment of a vehicle depending on the type of paint or finish applied to the cover member. Additionally, there was no way to change or replace the cover members, which would become nicked and marred over time. The only way to replace the cover member was to essentially replace the entire ventilator unit. All of these disadvantages are eliminated with the present device.

DETAILED DESCRIPTION OF THE PREFERRED EMBODIMENTS

Figure 1:
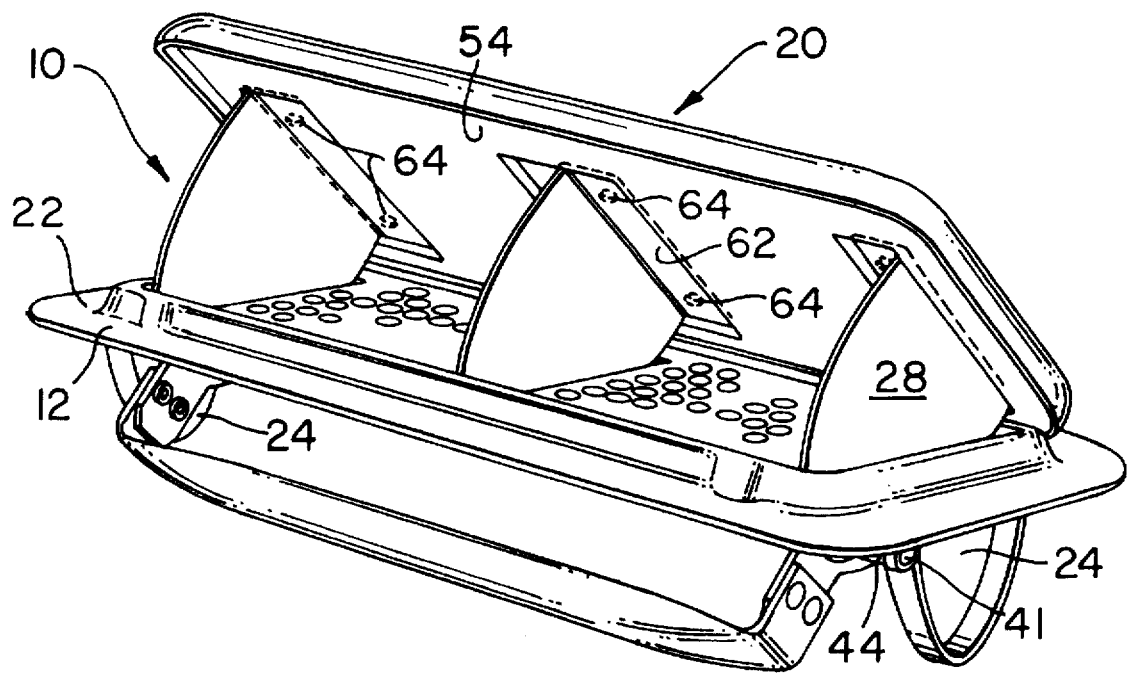
FIG. 1 is a perspective view of a prior art hingeless ventilator.

Reference will now be made in detail to the presently preferred embodiment of the invention, one or more examples of which are shown in the accompanying drawings. Each example is provided by way of explanation of the invention, and not meant as a limitation of the invention. For example, features illustrated or described as part of one embodiment can be used on another embodiment to yield still a further embodiment. It is intended that the present invention cover such modifications and variations that come within the scope of the appended claims and their equivalents.

Hingeless ventilators of the present type are well understood by those skilled in the art and the operation thereof is described in detail in my previous U.S. patents, particularly U.S. Pat. Nos. 3,839,950; 4,452,129; and 5,020,425, the disclosures of which are incorporated herein in their entirety. Thus, it is not essential for purposes of the present description to provide a detailed explanation of the hingeless ventilator features common to the prior art and described in my cited patents. Such features will be described generally to the extent necessary to provide a complete understanding of the present invention.

The hingeless ventilator 10 according to the invention includes a frame member 12 configured for attachment to a wall (not shown) of a compartment about an aperture defined through the wall. Frame 12 defines a central opening 16 therethrough for passing air through the aperture into the compartment, as is well understood by those skilled in the art. Frame 12 includes an up-turned flange 14 around central opening 16. Preferably, a perforated plate 18 covers opening 16. Plate 18 may be connected to frame 12 in any manner, but is preferably formed therewith as a integral component of frame 12.

A closure member, generally 20, is provided and is swingable against an outer side 22 of frame 12 for opening and closing opening 16.

Guide members 24 are connected to the underside of frame 12 and extend generally perpendicular thereto. Guide members 24 define guide surfaces 26 on the circumference thereof.

Arm members 28 extend from closure member 20 at opposite ends thereof through opening 16. In the embodiment wherein opening 16 is covered by perforated plate 18, arms 28 extend through slots cut through plate 18.

Figure 4:
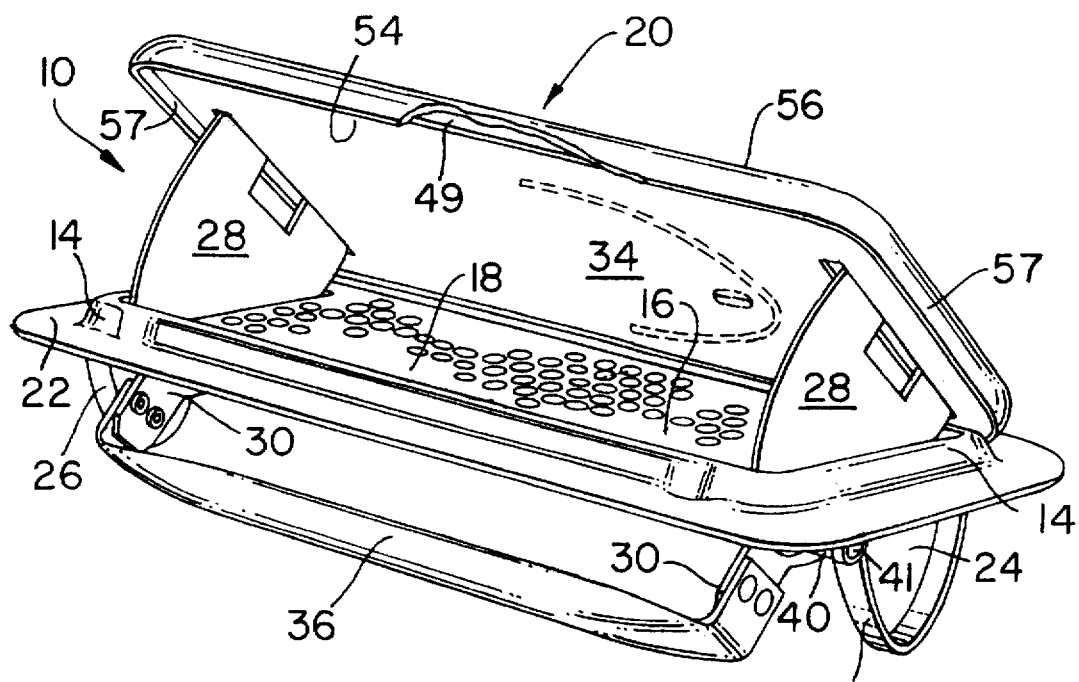
FIG. 4 is a perspective view of the hingeless ventilator according to the present invention utilizing compressible rollers as the holding mechanism.

A holding mechanism is provided with arm members 28 and guide members 24 to supply a closing tensile force to closure member 20 through the arm members and guide members. The tensile closing force holds closure member 20 relative to frame 12 in selected variable positions of the closure member. FIG. 4 illustrates the holding mechanism described and illustrated in my U.S. Pat. Nos. 4,452,129 and 5,020,425. In general, this holding mechanism includes a handle 36 connected to tabs 30 extending from arm members 28. Compressible or elastomeric rollers 40 are connected to axles 41 extending from arm members 28. Rollers 40 roll against guide surfaces 26 of guide members 24 in a compressed state and thereby provide a tensile closing force to closure member 20 through arm members 28. In operation, the operator pulls on handle 36 and is able to move rollers 40 into selected positions along the entire guide surface 26. As understood by those in the art, this allows for closure member 22 be swung in either direction relative to frame 12. In this regard, the ventilator can be opened in one direction to act as a forced air vent into a compartment, or opened in the opposite direction to act as an exhaust for the compartment.

Figure 5:
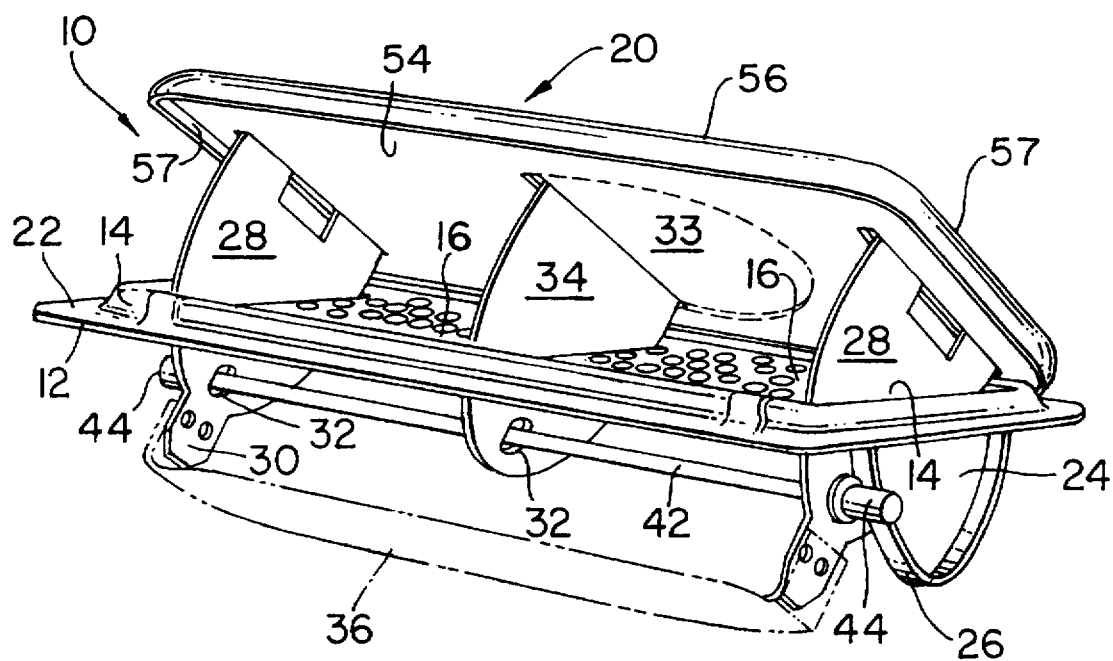
FIG. 5 is an alternative view of the hingeless ventilator according to the invention utilizing the spring rod holding mechanism.

FIGS. 1 and 5 illustrate an alternative embodiment of the holding mechanism which includes a spring rod 42 which extends through holes 32 defined in arms 28 and also in a central bracket 34 extending from closure member 20. Rollers 44 are attached to the ends of spring rod 42 and roll on guide surfaces 26 of guide members 24. This mechanism is described in detail in my U.S. Pat. No. 3,839,950, also incorporated in its entirety herein. The embodiment of FIG. 5 may also include a handle 36 (shown in dashed lines) connected to tabs 30. However, the handle may be eliminated in this embodiment, in which case tabs 30 would also be eliminated from arm members 28.

FIG. 1 illustrates a prior art configuration of closure member 20 wherein the closure member included a metal plate 60. Arm members 28 and bracket 34 were also metal and included flanges 62 for welding to metal plate 60. The components were typically spot welded at welds 64. Spot welds 64 were visible on the outer surface of metal plate 60, and were particularly noticeable under certain finished conditions of the outer surface of the metal plate.

Figure 2:
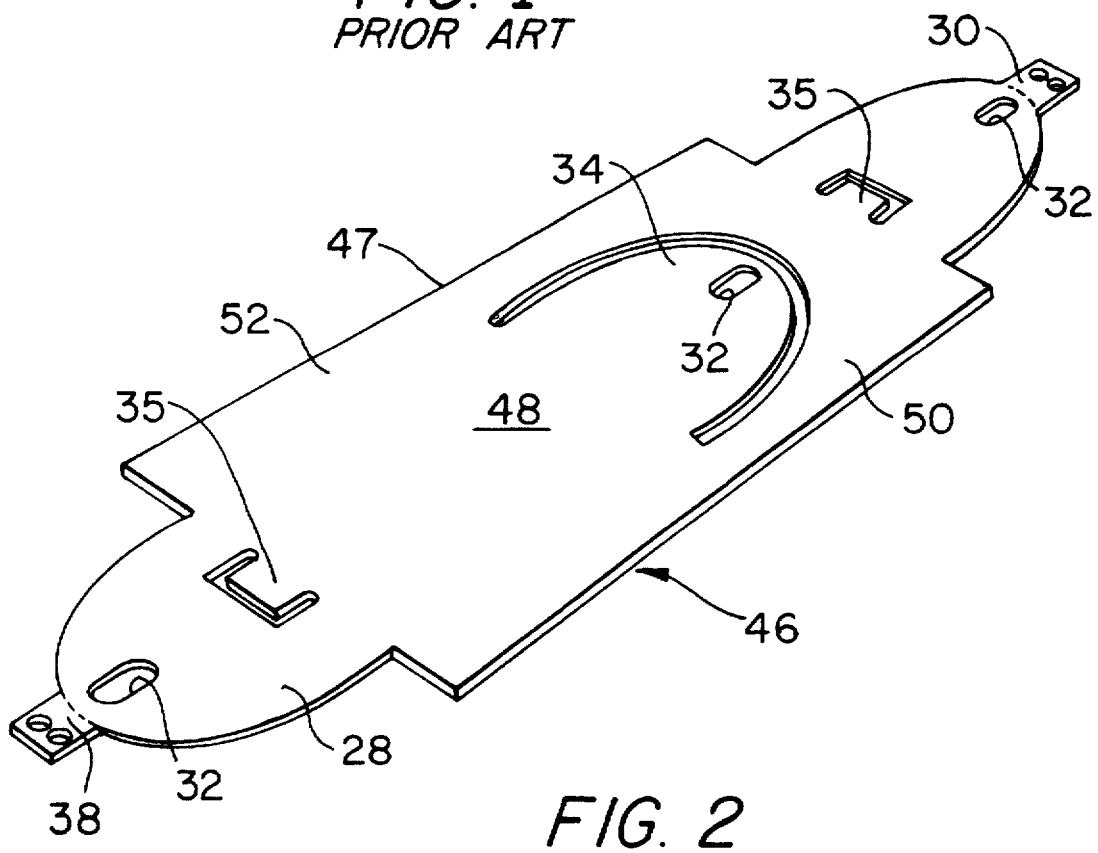
FIG. 2 is a perspective view of the unitary plate design according to the present invention.
Figure 3:
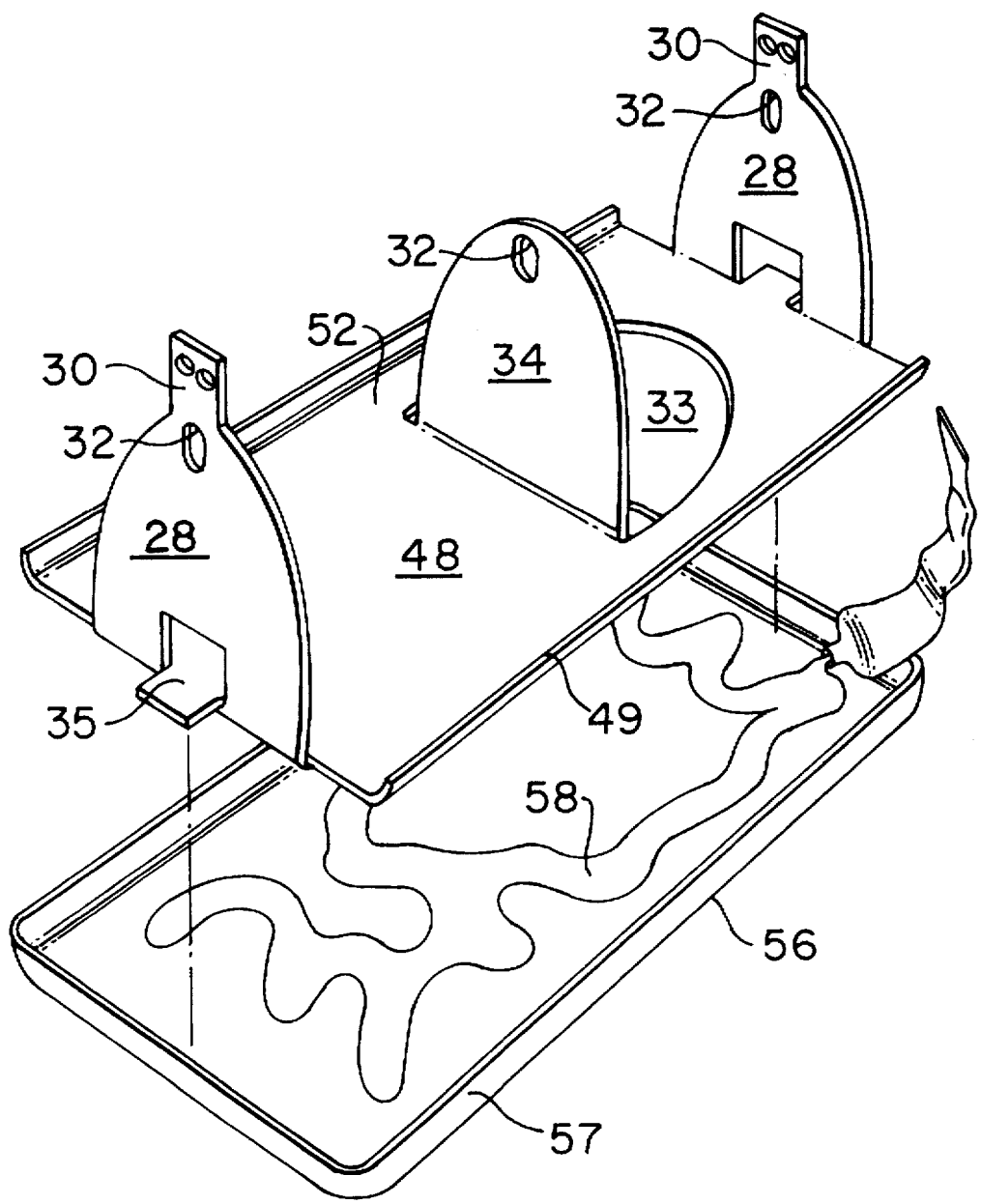
FIG. 3 is an assembly view of the closure member according to the invention particularly illustrating the unitary plate and plastic cover member attached thereto.

FIG. 2 illustrates the inventive closure member of the present invention. This closure member is formed by a unitary plate or bracket 46. Bracket 46 includes a base portion 48 having an inner surface 52 and an outer surface 50. Initially, bracket 34 and arm members 28 are flat since the unitary plate is preferably cut from a single piece of sheet metal. All of the necessary elements such as handle tabs 30, spring rod holes 32, bracket 34, are cut or defined in the sheet metal in a single manufacturing process. Once the unitary plate is formed, arms 28 and bracket 34 (if necessary) are then bent so as to extend at essentially a right-angle from base portion 48, as particularly seen in FIG. 3. The plate illustrated in FIGS. 2 and 3 can be configured with the holding mechanism illustrated in FIGS. 1 and 5, or the embodiment illustrated in FIG. 4. For the embodiment illustrated in FIG. 5, handle tabs 30 can be easily cut or snipped from arm members 28 at the dash lines illustrated in FIG. 2 if handle 36 is eliminated. Thus, it is not necessary to form a separate unitary plate for the different embodiments.

The long edges 47 of base portion 48 are then turned or rolled upward to form a flange 49. Flange 49 is sized to fit around and seal with flange 14 of frame member 12. Thus, base portion 48 absorbs any forces transferred by the frame member, particularly torsion forces.

In the embodiment of FIG. 4, the spring rod middle bracket 34 is not necessary. In this case, the middle bracket would simply not be bent upwards, but would remain flat as indicated in FIG. 4. As explained below, the bracket 34 will not be visible in the finished product.

Once middle bracket 34 is bent relative to base portion 48 for the embodiments of FIGS. 1 and 5, a corresponding hole 33 results in base portion 48. However, this hole is of no consequence since a cover member 56 is then attached to base portion 48, as particularly illustrated in FIG. 3. It is a relatively simple step to glue or otherwise attach cover member 56. For example, any number of commercial adhesives or tapes may be utilized in this regard. Cover member 56 may comprise a relatively inexpensive metal or plastic material which is easily molded or formed in a commercial process. The cover can be formed or molded with a textured outer surface, smooth surface, or any other aesthetically pleasing surface. Additionally, the cover member is easily painted or can be initially formed in a multitude of different colors. For example, the truck manufacturer can order covers in a series of different colors depending on the end use of the ventilator and can easily attach the cover members at the appropriate time.

Unitary plate 46 also includes alignment tabs 35 defined therein. Tabs 35 serve to ensure that base portion 48 is properly positioned within cover member 56 so that flange member 14 of frame 12 has adequate space between arm members 28 and flange 57 of the cover member, as can be particularly seen in FIG. 4. Flanges 57 are adjacent flanges 49 of base portion 48.

Preferably, a sealing or gasket material 54 is attached to the inner surface 52 of base portion 48. This sealing material provides an airtight and watertight seal against the upstanding flange 14 of base 12. In an alternative embodiment, sealing member 54 can be disposed as a strip adjacent to flange 57.

An important additional beneficial aspect of the invention is that the cover members 56 are readily replaceable if they should become marred or nicked over the life of the ventilator.

The cover members 56 according to the present invention are for aesthetic purposes and are far less expensive than the metal covers 60 of the prior art devices and significantly reduce the overall cost of the devices while allowing for far more flexibility and replaceability of components.

It should be apparent to those skilled in the art that various modifications and variations can be made in the present invention without departing from the scope and spirit of the invention. It is intended that the present invention cover such modifications and variations that come within the scope of the appended claims and their equivalence.

What is claimed is:

1. A hingeless ventilator for ventilating a compartment through an aperture in a wall thereof, comprising:

a frame configured for attachment to said wall about said aperture, said frame having a central opening therethrough for passing air through said aperture;

a closure member swingable against an outer side of said frame for opening and closing said opening;

guide members fixed to an inner side of said frame and extending generally normal to said frame;

arm members extending from said closure member at opposite ends thereof through said opening;

a holding mechanism configured with said arm members and said guide members, said holding mechanism supplying a closing tensile force to said closure member through said arm members to hold said closure member against and in selected positions relative to said frame; and wherein said closure member and said arm members are formed from a unitary plate with said arm members bent at essentially right angles to a base portion of said plate, said closure member further comprising a cover member attached to an outer surface of said base portion.

2. The hingeless ventilator as in claim 1, wherein said holding mechanism comprises elastomeric rollers mounted on said arm members and disposed to roll in a compressed state against said guide members.

3. The hingeless ventilator as in claim 1, wherein said holding mechanism comprises a spring rod mounted through said arm members with rollers attached to ends of said spring rod and disposed to roll on said guide members.

4. The hingeless ventilator as in claim 3, further comprising a spring rod bracket extending from said base portion of said unitary plate between said arm members, said spring rod extending through an opening in said spring rod.

5. The hingeless ventilator as in claim 1, wherein said unitary plate is stamped from sheet metal.

6. The hingeless ventilator as in claim 1, wherein said unitary plate is cut from a single sheet of metal.

7. The hingeless ventilator as in claim 1, wherein said cover member comprises a cover attached to said base portion.

8. The hingeless ventilator as in claim 7, wherein said cover member adhered to said base portion.

9. The hingeless ventilator as in claim 1, wherein said base portion of said unitary plate comprises alignment tabs to ensure proper placement of said base portion in said cover member.

10. The hingeless ventilator as in claim 1, wherein said base portion comprises longitudinally extending flanges from the edges thereof, said base portion flanges aligning with flanges on said frame.

11. The hingeless ventilator as in claim 1, further comprising a sealing gasket member adhered to an underside of said base portion for sealing engagement with said frame member.

12. The hingeless ventilator as in claim 1, further comprising a perforated plate extending across said central opening and connected to said frame, said arm members extending through said perforated plate.

13. The hingeless ventilator as in claim 11, wherein said perforated plate and said frame are formed as an integral component.

* * * * *